United States Patent
Jiang et al.

(10) Patent No.: US 11,876,988 B2
(45) Date of Patent: Jan. 16, 2024

(54) METHOD AND APPARATUS FOR TASK-ADAPTIVE PRE-PROCESSING FOR NEURAL IMAGE COMPRESSION

(71) Applicant: TENCENT AMERICA LLC, Palo Alto, CA (US)

(72) Inventors: Wei Jiang, Sunnyvale, CA (US); Wei Wang, San Jose, CA (US); Ding Ding, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 388 days.

(21) Appl. No.: 17/365,395

(22) Filed: Jul. 1, 2021

(65) Prior Publication Data
US 2022/0232232 A1      Jul. 21, 2022

Related U.S. Application Data

(60) Provisional application No. 63/138,901, filed on Jan. 19, 2021.

(51) Int. Cl.
*H04N 19/42* (2014.01)
*H04N 19/147* (2014.01)
(Continued)

(52) U.S. Cl.
CPC .......... *H04N 19/42* (2014.11); *G06F 18/214* (2023.01); *G06V 10/82* (2022.01); *H04N 19/147* (2014.11)

(58) Field of Classification Search
None
See application file for complete search history.

(56) References Cited

U.S. PATENT DOCUMENTS

| 2009/0073503 A1* | 3/2009 | Lebaschi | H04N 1/32133 358/450 |
| 2009/0110070 A1* | 4/2009 | Takahashi | H04N 19/60 375/E7.243 |

(Continued)

OTHER PUBLICATIONS

Song et al., "Rapid Structural Pruning of Neural Networks with Set-based Task-Adaptive Meta-Pruning", arXiv:2006.12139v1 [cs.LG] Jun. 22, 2020, Retrieved on Sep. 10, 2021. Retrieved from <URL: https://arxiv.org/pdf/2006.12139.pdf>, pp. 1-14 (14 pages total).

(Continued)

*Primary Examiner* — Delomia L Gilliard
(74) *Attorney, Agent, or Firm* — Sughrue Mion, PLLC

(57) ABSTRACT

A method of task-adaptive pre-processing (TAPP) for neural image compression is performed by at least one processor and includes generating a substitutional image, based on an input image, using a TAPP neural network, and encoding the generated substitutional image to generate a compressed representation, using a first neural network. The TAPP neural network is trained by generating a substitutional training image, based on an input training image, using the TAPP neural network, encoding the generated substitutional training image to generate a compressed training representation, using the first neural network, decoding the generated compressed training representation to reconstruct an output training image, using a second neural network, generating gradients of a rate-distortion (R-D) loss that is generated based on the input training image, the reconstructed output training image and the generated compressed training representation, and updating the generated substitutional training image, based on the generated gradients of the R-D loss.

20 Claims, 8 Drawing Sheets

(51) Int. Cl.
*G06F 18/214* (2023.01)
*G06V 10/82* (2022.01)

(56) References Cited

U.S. PATENT DOCUMENTS

| | | |
|---|---|---|
| 2017/0230675 A1* | 8/2017 | Wierstra ................ G06N 3/047 |
| 2017/0249536 A1 | 8/2017 | Hillar et al. |
| 2021/0159912 A1 | 5/2021 | Wang et al. |

OTHER PUBLICATIONS

Yoon et al., "TapNet: Neural Network Augmented with Task-Adaptive Projection for Few-Shot Learning", Proceedings of the 36th International Conference on Machine Learning 2019, Jun. 22, 2020 (9 pages total).
International Search Report dated Nov. 8, 2021 from the International Searching Authority in International Application No. PCT/US2021/044900.
Written Opinion dated Nov. 8, 2021 from the International Searching Authority in International Application No. PCT/US2021/044900.
Extended European Search Report dated Sep. 14, 2023 in Application No. 21921589.4.
Wei Wang et al., "Substitutional Neural Image Compression," Tencent America LLC, Jun. 27, 2020, M53379 (9 pages total).

* cited by examiner

METHOD AND APPARATUS FOR TASK-ADAPTIVE PRE-PROCESSING FOR NEURAL IMAGE COMPRESSION

CROSS-REFERENCE TO RELATED APPLICATION

This application is based on and claims priority to U.S. Provisional patent application Ser. No. 63/138,901, filed on Jan. 19, 2021, the disclosure of which is incorporated by reference herein in its entirety.

BACKGROUND

ISO/IEC MPEG (JTC 1/SC 29/WG 11) has been actively searching for potential needs for standardization of future video coding technology. ISO/IEC JPEG has established the JPEG-AI group focusing on AI-based end-to-end Neural Image Compression (NIC) using Neural Networks (NN). The success of recent approaches has brought more and more industrial interests in advanced neural image and video compression methodologies.

Although prior arts have shown promising performance, one major issue of NIC methods is the difficulty in post-training control. For example, flexible bitrate control is challenging, as traditional NIC methods may need to train multiple model instances targeting each desired Rate-Distortion (R-D) trade-off individually. Similarly, for each target quality loss (such as peak signal-to-noise ratio (PSNR) or structural similarity index measure (SSIM)), a model instance is trained individually. Once trained for a target task (e.g., for a target bitrate or a target quality loss), the model instance can not work for other tasks (e.g., other bitrates or other quality losses).

SUMMARY

According to embodiments, a method of task-adaptive pre-processing (TAPP) for neural image compression is performed by at least one processor and includes generating a substitutional image, based on an input image, using a TAPP neural network, and encoding the generated substitutional image to generate a compressed representation, using a first neural network. The TAPP neural network is trained by generating a substitutional training image, based on an input training image, using the TAPP neural network, encoding the generated substitutional training image to generate a compressed training representation, using the first neural network, decoding the generated compressed training representation to reconstruct an output training image, using a second neural network, generating gradients of a rate-distortion (R-D) loss that is generated based on the input training image, the reconstructed output training image and the generated compressed training representation, and updating the generated substitutional training image, based on the generated gradients of the R-D loss.

According to embodiments, an apparatus for task-adaptive pre-processing (TAPP) for neural image compression includes at least one memory configured to store program code, and at least one processor configured to read the program code and operate as instructed by the program code. The program code includes generating code configured to cause the at least one processor to generate a substitutional image, based on an input image, using a TAPP neural network, and encoding code configured to cause the at least one processor to encode the generated substitutional image to generate a compressed representation, using a first neural network. The TAPP neural network is trained by generating a substitutional training image, based on an input training image, using the TAPP neural network, encoding the generated substitutional training image to generate a compressed training representation, using the first neural network, decoding the generated compressed training representation to reconstruct an output training image, using a second neural network, generating gradients of a rate-distortion (R-D) loss that is generated based on the input training image, the reconstructed output training image and the generated compressed training representation, and updating the generated substitutional training image, based on the generated gradients of the R-D loss.

According to embodiments, a non-transitory computer-readable medium stores instructions that, when executed by at least one processor for task-adaptive pre-processing (TAPP) for neural image compression, cause the at least one processor to generate a substitutional image, based on an input image, using a TAPP neural network, and encode the generated substitutional image to generate a compressed representation, using a first neural network. The TAPP neural network is trained by generating a substitutional training image, based on an input training image, using the TAPP neural network, encoding the generated substitutional training image to generate a compressed training representation, using the first neural network, decoding the generated compressed training representation to reconstruct an output training image, using a second neural network, generating gradients of a rate-distortion (R-D) loss that is generated based on the input training image, the reconstructed output training image and the generated compressed training representation, and updating the generated substitutional training image, based on the generated gradients of the R-D loss.

DETAILED DESCRIPTION

The disclosure describes methods and apparatuses for a Task-Adaptive Pre-Processing (TAPP) framework of preprocessing an input image of an NIC method to flexibly adapt to a compression task, such as a quality metric or a bitrate. When a target task of adaptation is the same as an original task an underlying NIC model was trained for, the pre-processing adapts the input image to a substitute version that is better than an original image for compression.

Figure 1:
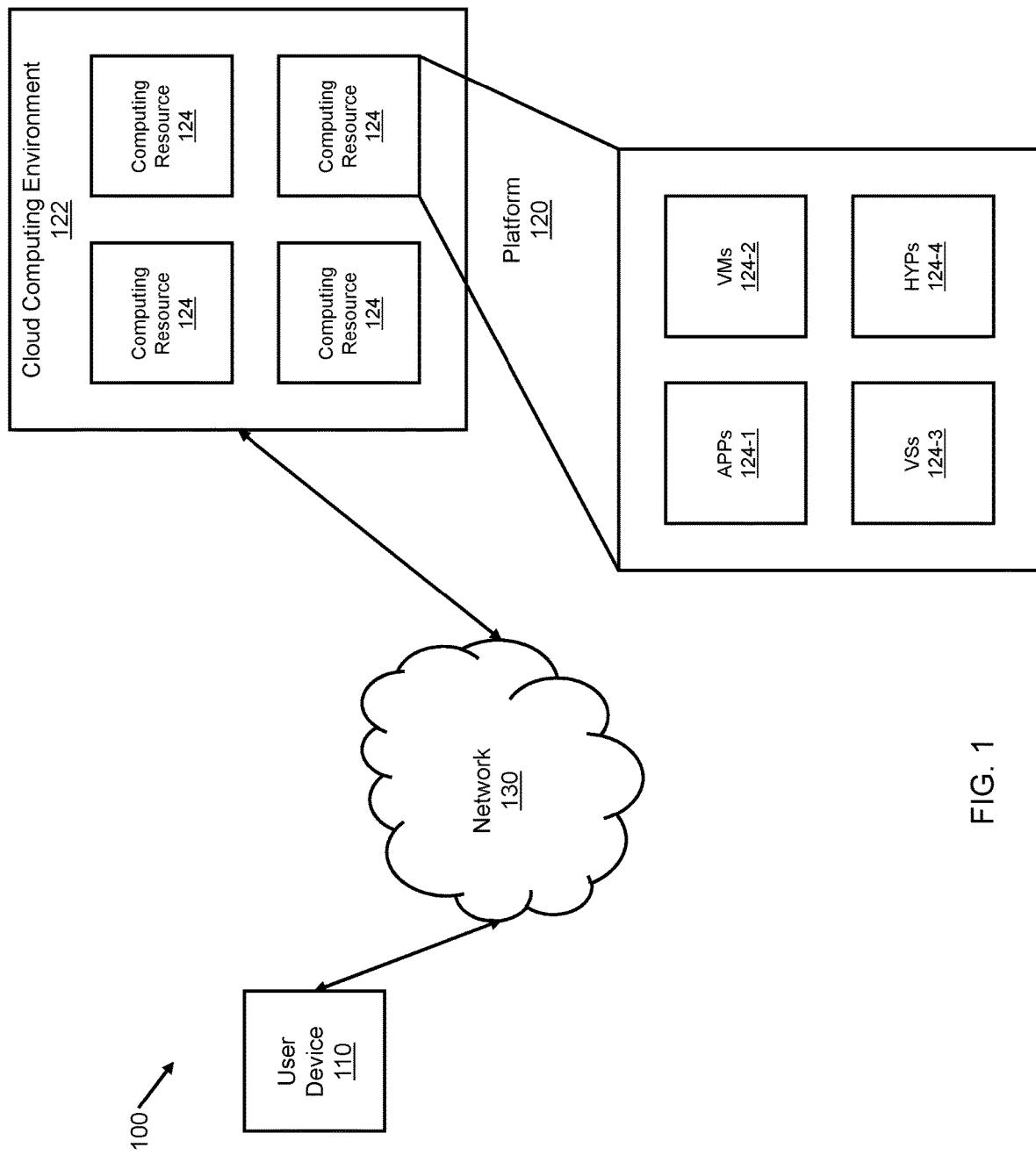
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
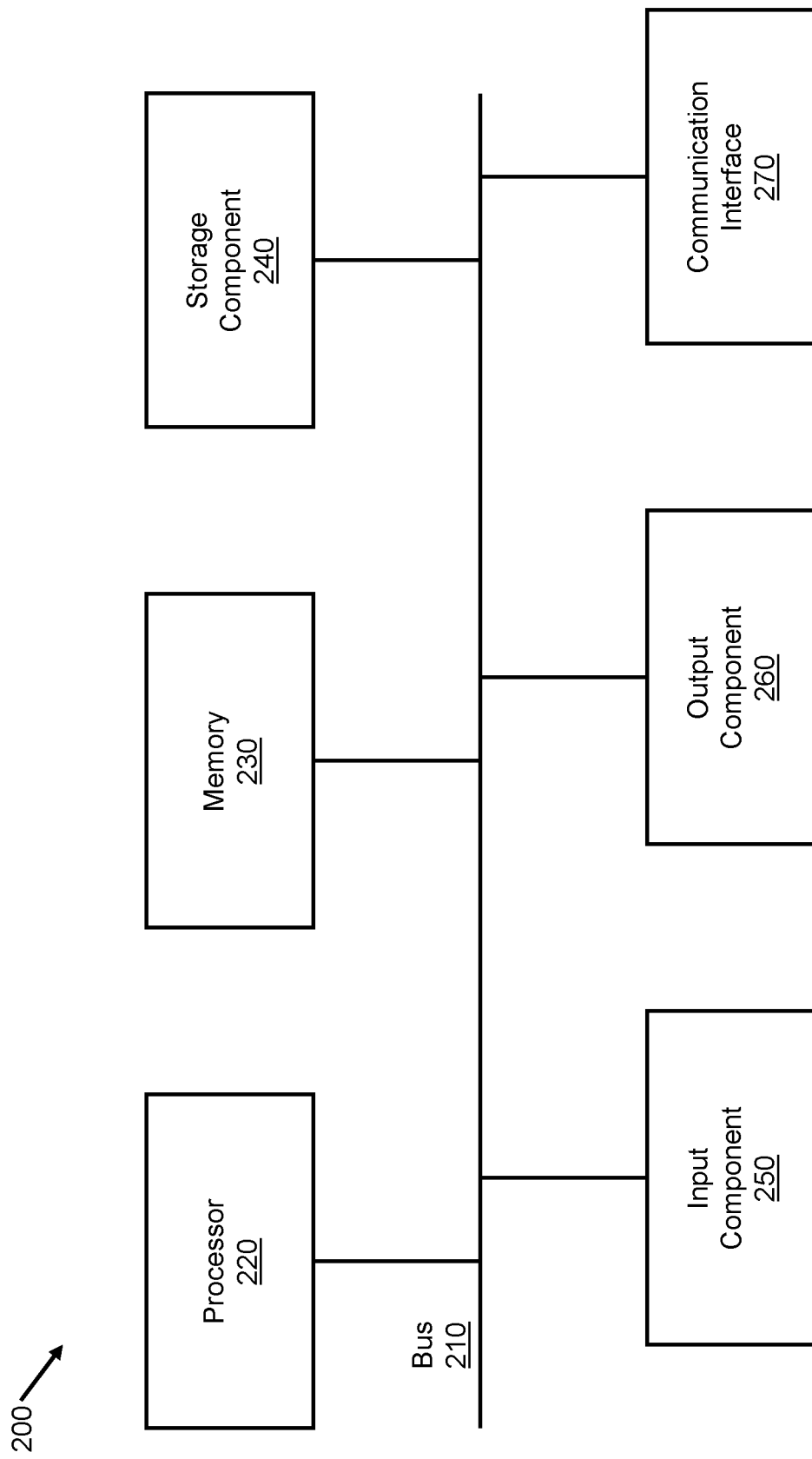
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for task-adaptive pre-processing for neural image compression will now be described in detail.

Figure 3:
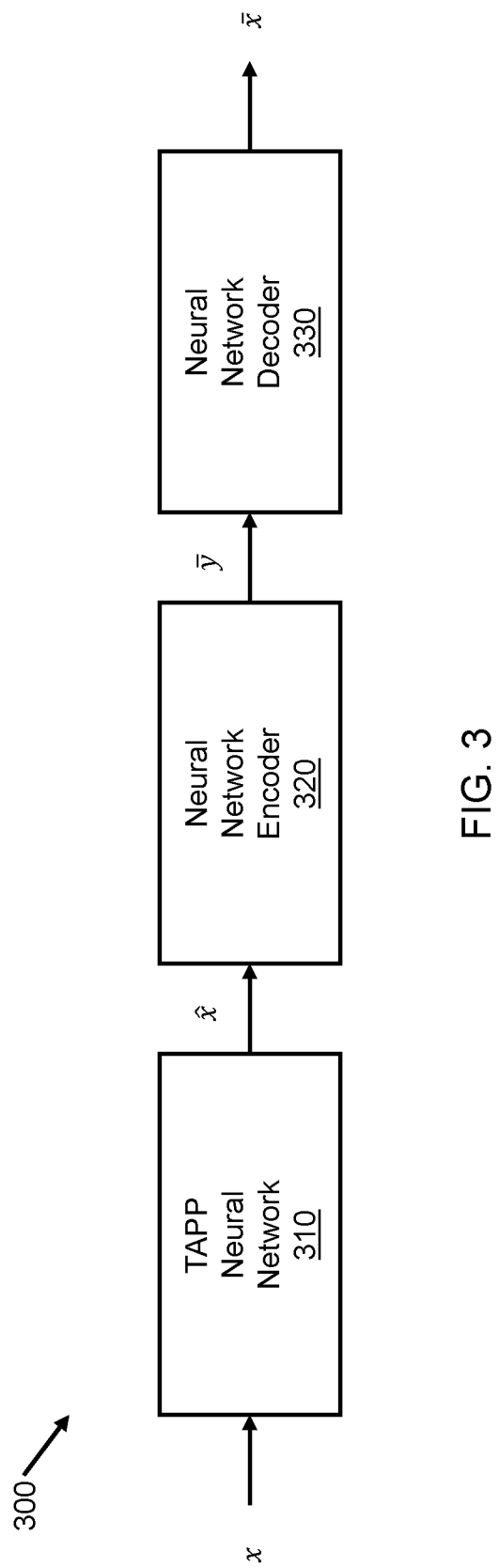
FIG. 3 is a block diagram of an apparatus for task-adaptive pre-processing for neural image compression, during a test stage, according to embodiments.

FIG. 3 is a block diagram of an apparatus 300 for task-adaptive pre-processing for neural image compression, during a test stage, according to embodiments.

As shown in FIG. 3, the apparatus 300 includes a TAPP NN 310, an NN encoder 320 and an NN decoder 330.

Given an input image x of size (h,w,c), where h, w, c are a height, a width, and a number of channels, respectively, a target of the test stage of an NIC workflow is to compute or generate a compressed representation $\bar{y}$ that is compact for storage and transmission, and then, based on the compressed representation $\bar{y}$, to reconstruct an output image $\bar{x}$ on a decoder side, so that the reconstructed output image $\bar{x}$ may be similar to the original input image x.

Referring to FIG. 3, the input image x is first fed into the TAPP NN to compute or generate a substitutional image $\hat{x}$. In embodiments, the TAPP NN 310 is used by a TAPP module, which computes or generates a substitutional perturbation $\delta(x)$ based on the input image x and computes or generates the substitutional image $\hat{x}$ as $x+\delta(x)$.

After that, the substitutional image $\hat{x}$ is input into an NN encoding module, which uses the NN encoder 320 that computes or generates the compressed representation $\bar{y}$. Then, on the decoder side, an NN decoding module computes or generates the reconstructed output image $\bar{x}$, using the NN decoder 330, based on the compressed representation $\bar{y}$. In this disclosure, there are not have any restrictions on network architectures of the TAPP NN 310, the NN encoder 320 and the NN decoder 330.

Figure 4A:
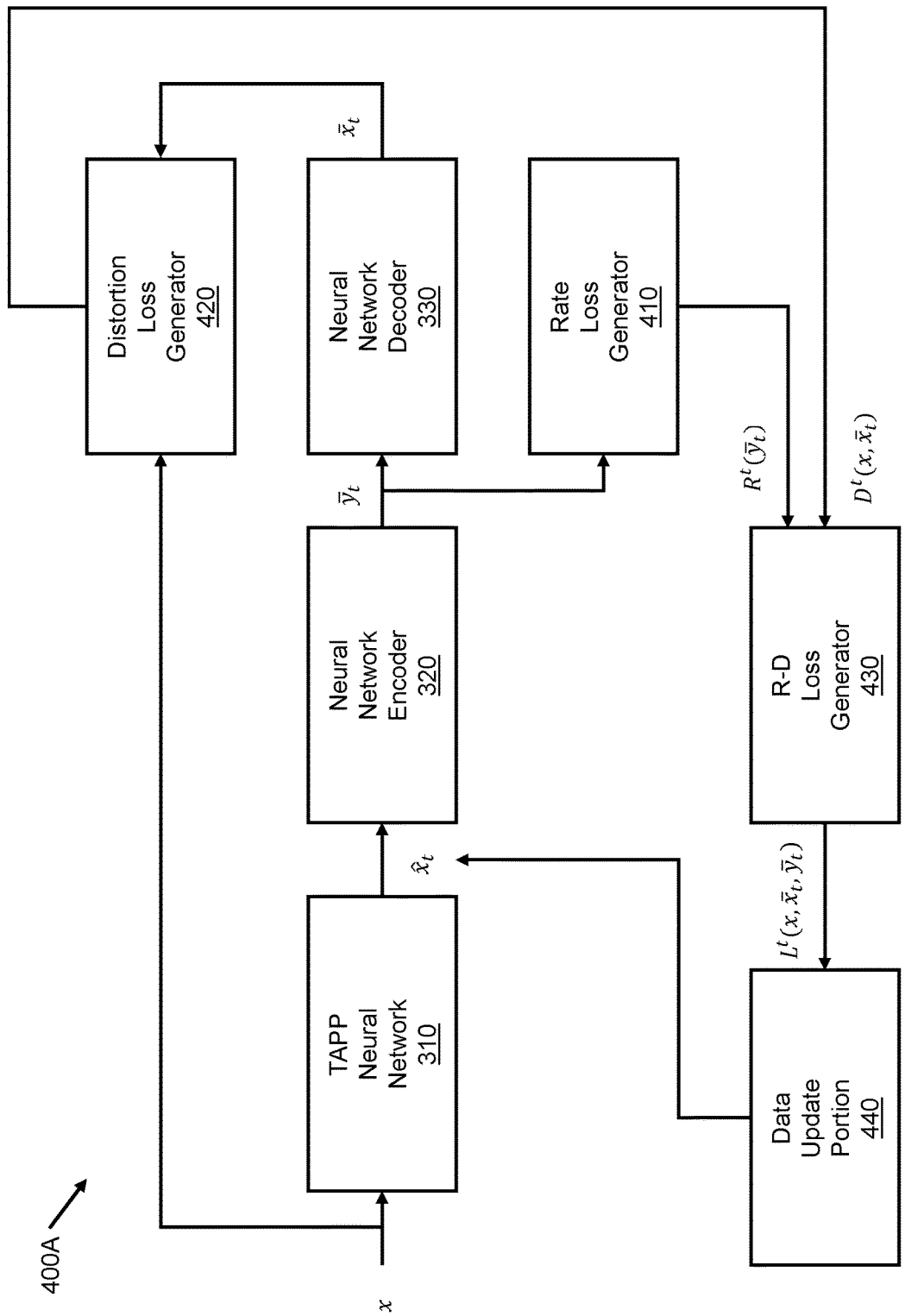
FIG. 4A is a block diagram of a training apparatus for task-adaptive pre-processing for neural image compression, during a first step of a training stage, according to embodiments.
Figure 4B:
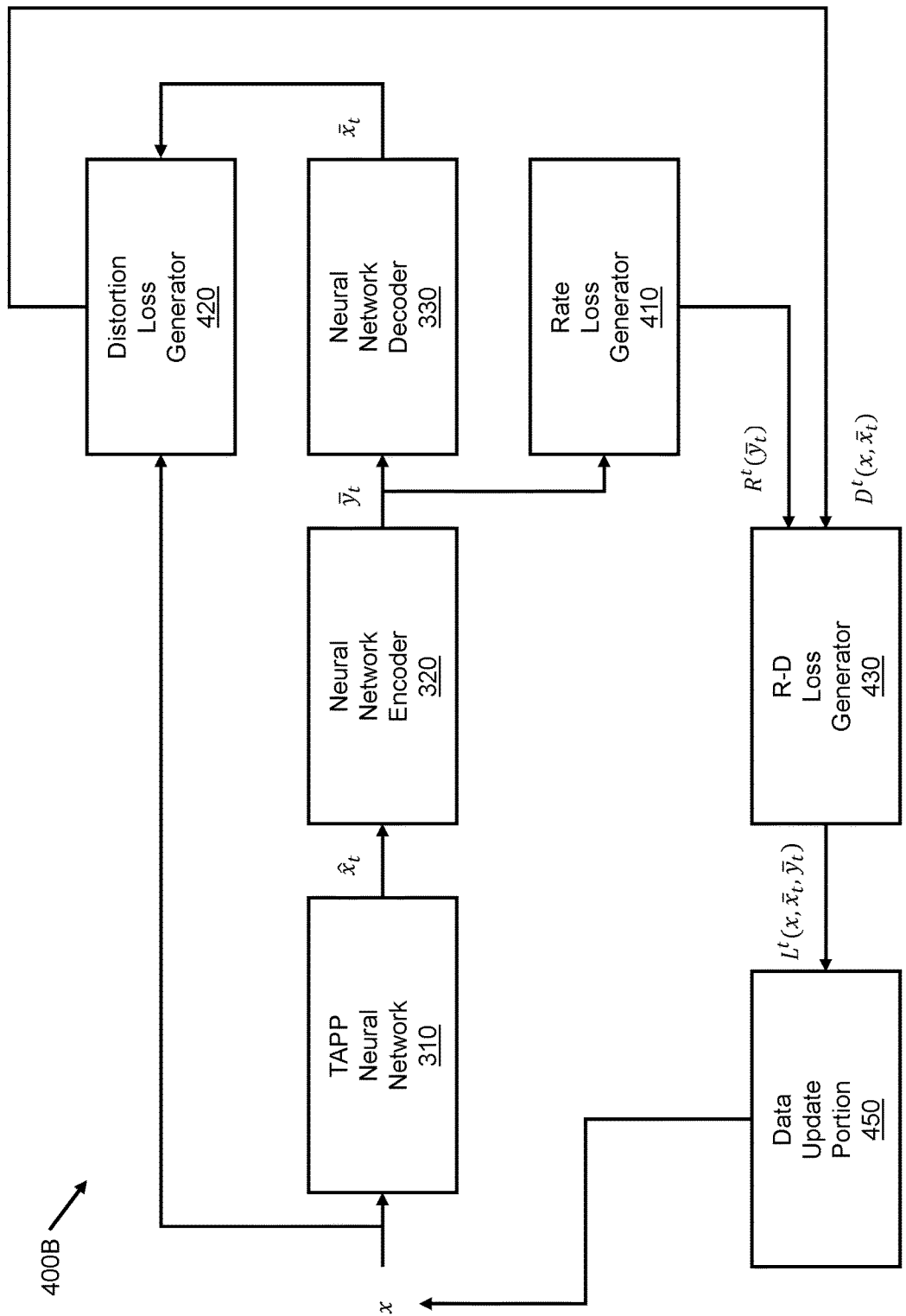
FIG. 4B is another block diagram of a training apparatus for task-adaptive pre-processing for neural image compression, during a first step of a training stage, according to embodiments.
Figure 4C:
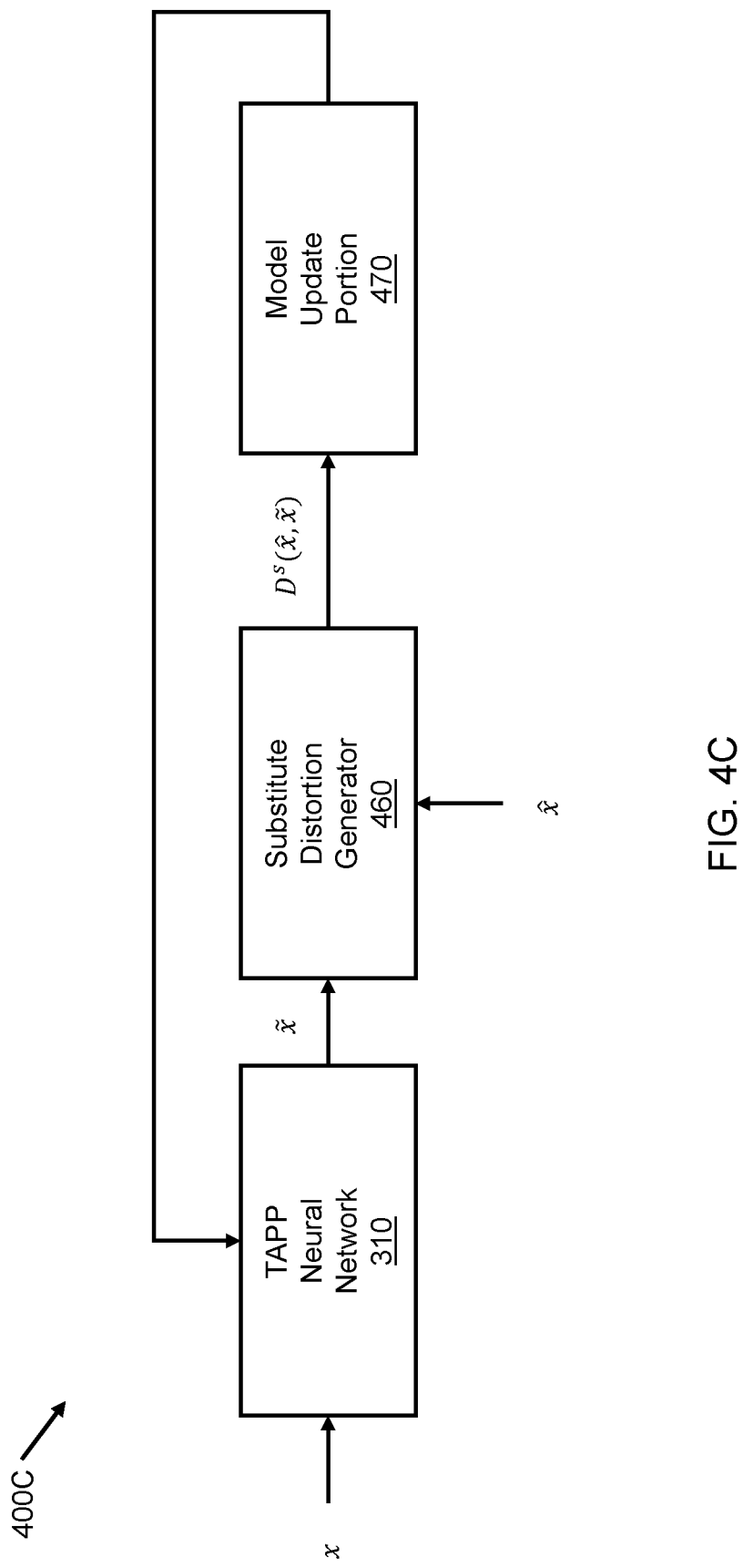
FIG. 4C is a block diagram of a training apparatus for task-adaptive pre-processing for neural image compression, during a second step of a training stage, according to embodiments.

FIG. 4A is a block diagram of a training apparatus 400A for task-adaptive pre-processing for neural image compression, during a first step of a training stage, according to embodiments. FIG. 4B is another block diagram of a training apparatus 400B for task-adaptive pre-processing for neural image compression, during a first step of a training stage, according to embodiments. FIG. 4C is a block diagram of a training apparatus 400C for task-adaptive preprocessing for neural image compression, during a second step of a training stage, according to embodiments.

For training an NIC model, an R-D loss may be used. A distortion loss $D(x, \bar{x})$ is computed to measure a reconstruction error, such as either one or both of PSNR and SSIM. A rate loss $R(\bar{y})$ is computed to measure a bit consumption of the compressed representation $\bar{y}$. A trade-off hyperparameter $\lambda$ is used for the R-D loss:

$$L(x,\bar{x},\bar{y}) = \lambda D(x,\bar{x}) + R(\bar{y}) \qquad (1).$$

Training with a large hyperparameter $\lambda$, results in compression models with smaller distortion but more bit consumption, and vice versa.

Referring to FIGS. 4A and 4B, assume that an underlying NIC model instance (i.e., the NN encoder 320 and the NN decoder 330) is trained with an original R-D loss $L_0(x,\bar{x}, \bar{y}) = \lambda_0 D_0(x,\bar{x}) + R_0(\bar{y})$. Let $Enc_0$ and $Dec_0$ denote the trained NN encoder 320 and the trained NN decoder 330, respectively. In embodiments, $Enc_0$ and $Dec_0$ is fixed, and only the TAPP NN 310 is trained. That is, the TAPP module is trained as an add-on component to adapt the $Enc_0$ and $Dec_0$ so that compression results will be tailored for a task. In embodiments, the NN encoder 320 and/or the NN decoder 330 can also be updated, so that the underlying NIC model instance can also be adjusted to fit some tasks after training.

FIGS. 4A-4C describe an overall workflow of the training stage, which contains two steps for each training data.

As shown in FIGS. 4A and 4B, each of the training apparatus 400A and 400B includes the TAPP NN 310, the NN encoder 320, the NN decoder 330, a rate loss generator 410, a distortion loss generator 420 and an R-D loss generator 430. The training apparatus 400A includes a data update portion 440, and the training apparatus 400B includes a data update portion 450.

Given an input training image x, in the first step shown in FIGS. 4A and 4B, it is first passed through the TAPP module to generate a substitutional image $\hat{x}_t$ by using current model parameters of the TAPP NN 310. Similar to the test stage, in embodiments, a substitutional perturbation $\delta_t(x)$ is computed or generated, and the substitutional image $\hat{x}_t$ is given by $\hat{x}_t = x + \delta_t(x)$.

After that, using the substitutional image $\hat{x}_t$ as input, the NN encoder 320 generates a compressed representation $\bar{y}_t$ in the NN encoding module. Then, the NN decoder 330 reconstructs an output image $\bar{x}_t$ through the NN decoding module, based on the compressed representation $\bar{y}_t$.

The distortion loss generator 420 computes or generates a task distortion loss $D^t(x, \bar{x}_t)$, which can be the same or different from $D_0(x, \bar{x}_t)$. The rate loss generator 410 computes or generates a task rate loss $R^t(\bar{y}_t)$, which can be the same or different from $R_0(\bar{y}_t)$.

Then, the R-D loss generator 430 computes or generates a task R-D loss $L^t(x, \bar{x}_t, \bar{y}_t)$ as:

$$L^t(x,\bar{x}_t,\bar{y}_t) = \lambda^t D^t(x,\bar{x}_t) + R^t(\bar{y}_t) \qquad (2).$$

Referring to FIG. 4A, the data update portion 440 computes or generates gradients of the task R-D loss $L^t(x, \bar{x}_t, \bar{y}_t)$, and uses these gradients to update the substitutional image $\hat{x}_t$, through back-propagation. The updated substitutional image $\hat{x}_t$ will be fed into the NN encoder 320 again, and the training apparatus 400A iterates the above inference process. Finally, after T iterations (e.g., upon reaching a maximum iteration number or until the R-D loss converges), the training apparatus 400A obtains a final updated substitutional image $\hat{x}_t$.

Referring to FIG. 4B, the data update portion 450 computes or generates gradients of the task R-D loss $L^t(x, \bar{x}_t, \bar{y})$, and uses these gradients to update the input image x, through back-propagation. The updated input image x will be fed into the TAPP NN 310 again, and the training apparatus 400B iterates the above inference process. Finally, after T iterations (e.g., upon reaching a maximum iteration number or until the R-D loss converges), the training apparatus 400B obtains the final updated input image x, which is fed into the TAPP NN 310 to generate the final updated substitutional image $\bar{x}_t$.

In both FIGS. 4A and 4B, the final updated substitutional image $\hat{x}_t$ may be used as a ground-truth target that the TAPP NN 310 tries to adapt the input image x into.

In embodiments, additional losses can be computed and combined with the R-D loss of Equation (2), and gradients of the combined losses can be used by the data update portion 440 or 450 to update the input image x or the substitutional image $\bar{x}_t$. For example, an NN discriminator can be used to classify whether its input is the original input image x or the reconstructed output image $\bar{x}_t$, and a classification loss can be used as an additional loss. Also, an NN feature extractor can be used to extract features from the original input image x or the reconstructed output image $\bar{x}_t$, and a discriminator can be used to classify whether the extracted features come from the original input image x or the reconstructed output image $\bar{x}_t$. The classification loss can also be used as an additional loss to regularize a learning process.

As shown in FIG. 4C, the training apparatus 400C includes the TAPP NN 310, a substitute distortion generator 460 and a model update portion 470.

Referring to FIG. 4C, in step 2, an original input image x is fed into the TAPP NN 310 to generate an estimated substitutional image $\tilde{x}$ by using current model parameters of the TAPP NN 310. The substitute distortion generator 460 computes or generates a substitute distortion loss $D^s(\hat{x}, \tilde{x})$ to measure a difference between a final ground-truth substitutional image $\hat{x}$ and the estimated substitutional image $\tilde{x}$, e.g., a mean squared error (MSE) or SSIM loss. The model update portion 470 computes or generates gradients of the substitute distortion loss $D^s(\hat{x}, \tilde{x})$ and back-propagates these gradients to update the current model parameters of the TAPP NN 310.

In embodiments, additional losses can be computed and combined with the substitute distortion loss $D^s(\hat{x}, \tilde{x})$, and gradients of the combined losses can be used by the model update portion 470 to update the current model parameters of the TAPP NN 310. For example, an NN discriminator can be used to classify whether its input is the original input image x or the estimated substitutional image $\tilde{x}$, and a classification loss can be used as an additional loss. Also, an NN feature extractor can be used to extract features from the original input image x or the estimated substitutional image $\tilde{x}$, and a discriminator can be used to classify whether the extracted features come from the original input image x or the estimated substitutional image $\tilde{x}$. The classification loss can also be used as an additional loss to regularize a learning process.

The model update portion 470 can update model parameters of the TAPP NN 310 for every training input image x. It can also accumulate gradients of a batch of training input images, and update the model parameters for each batch.

In embodiments, a part or all of parameters of a trained underlying NIC model instance (i.e., the NN encoder 320 and/or NN decoder 330) can also be updated in step 2 of the above training process. The underlying NIC model instance can be updated at different time stamps than the TAPP NN 310.

The embodiments described herein use a TAPP module to adapt a trained underlying NIC model instance to compress inputs tailored for a new task, which can be the same or different from an original NIC target.

The embodiments described herein have advantages of flexible target control (e.g., bit rate control when a new task target is a new compression bit rate, quality control when the new task target is a new quality metric, and/or improved compression when the new task target is the same as an original NIC task). The framework is flexible to accommodate various types of underlying NIC methods.

Figure 5:
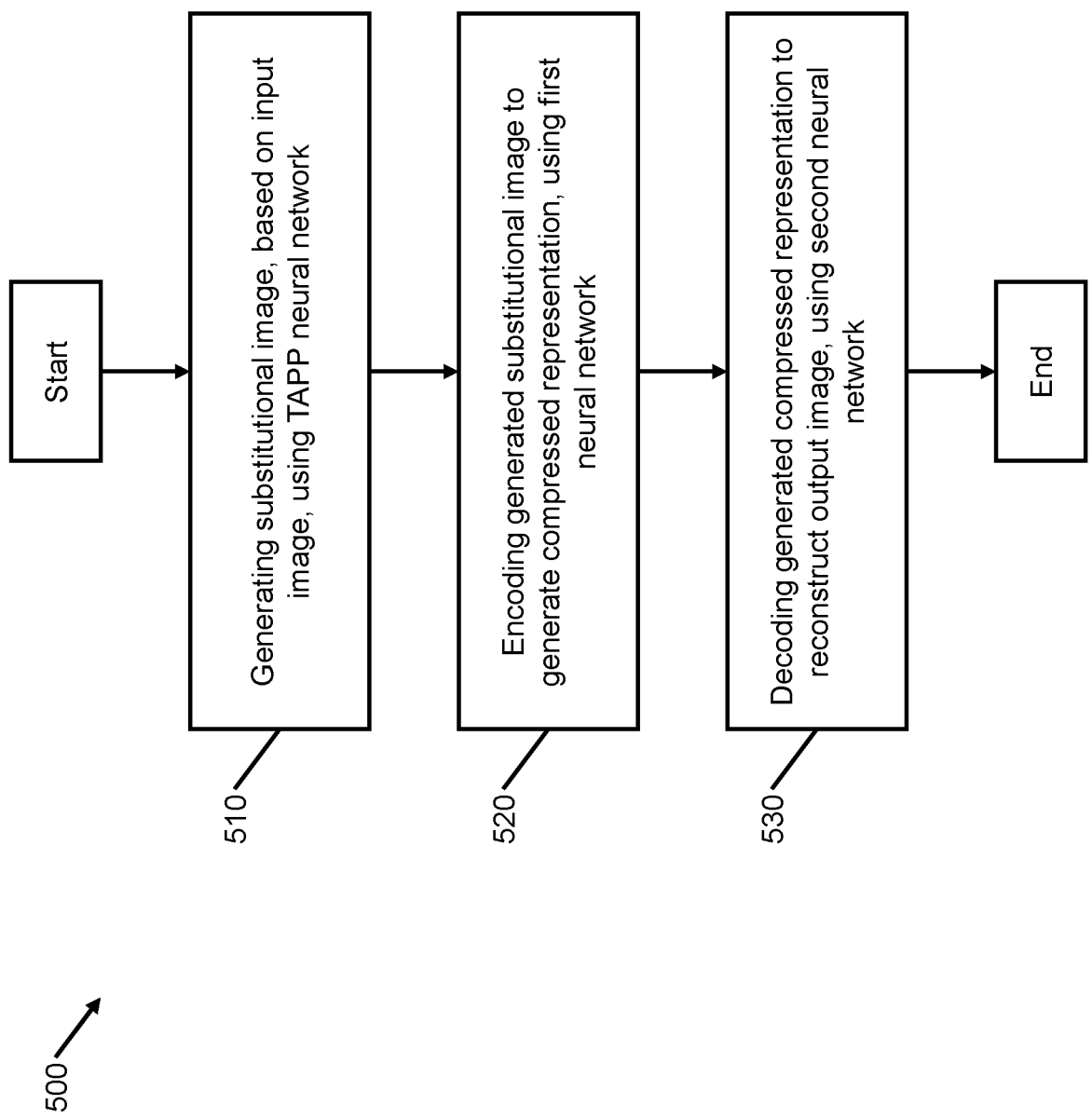
FIG. 5 is a flowchart of a method of task-adaptive pre-processing for neural image compression, according to embodiments.

FIG. 5 is a flowchart of a method of task-adaptive pre-processing for neural image compression, according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes generating a substitutional image, based on an input image, using a TAPP neural network.

In operation 520, the method 500 includes encoding the generated substitutional image to generate a compressed representation, using a first neural network.

The TAPP neural network is trained by generating a substitutional training image, based on an input training image, using the TAPP neural network, encoding the generated substitutional training image to generate a compressed training representation, using the first neural network, decoding the generated compressed training representation to reconstruct an output training image, using a second neural network, generating gradients of a rate-distortion (R-D) loss that is generated based on the input training image, the reconstructed output training image and the generated compressed training representation, and updating the generated substitutional training image, based on the generated gradients of the R-D loss.

In operation 530, the method 500 includes decoding the generated compressed representation to reconstruct an output image, using the second neural network.

The generating the substitutional image may include generating a substitutional perturbation, based on the input image, using the TAPP neural network, and generating the substitutional image as a sum of the input image and the generated substitutional perturbation.

The TAPP neural network may be further trained by generating the R-D loss, based on a hyperparameter, a distortion loss that is a reconstruction error between the input training image and the reconstructed output training image, and a rate loss that is a bit consumption of the generated compressed training representation.

The gradients of the R-D loss may be generated and the generated substitutional training image may be updated until a maximum number of iterations is performed or until the R-D loss converges.

The TAPP neural network may be further trained by updating the input training image, based on the generated gradients of the R-D loss, and the gradients of the R-D loss may be generated and the input training image may be updated until a maximum number of iterations is performed or until the R-D loss converges.

The TAPP neural network may be further trained by generating a substitute distortion as a difference between a ground-truth substitutional image and the generated substitutional training image, generating gradients of the generated substitute distortion, and updating parameters of the TAPP neural network, based on the generated gradients of the generated substitute distortion.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
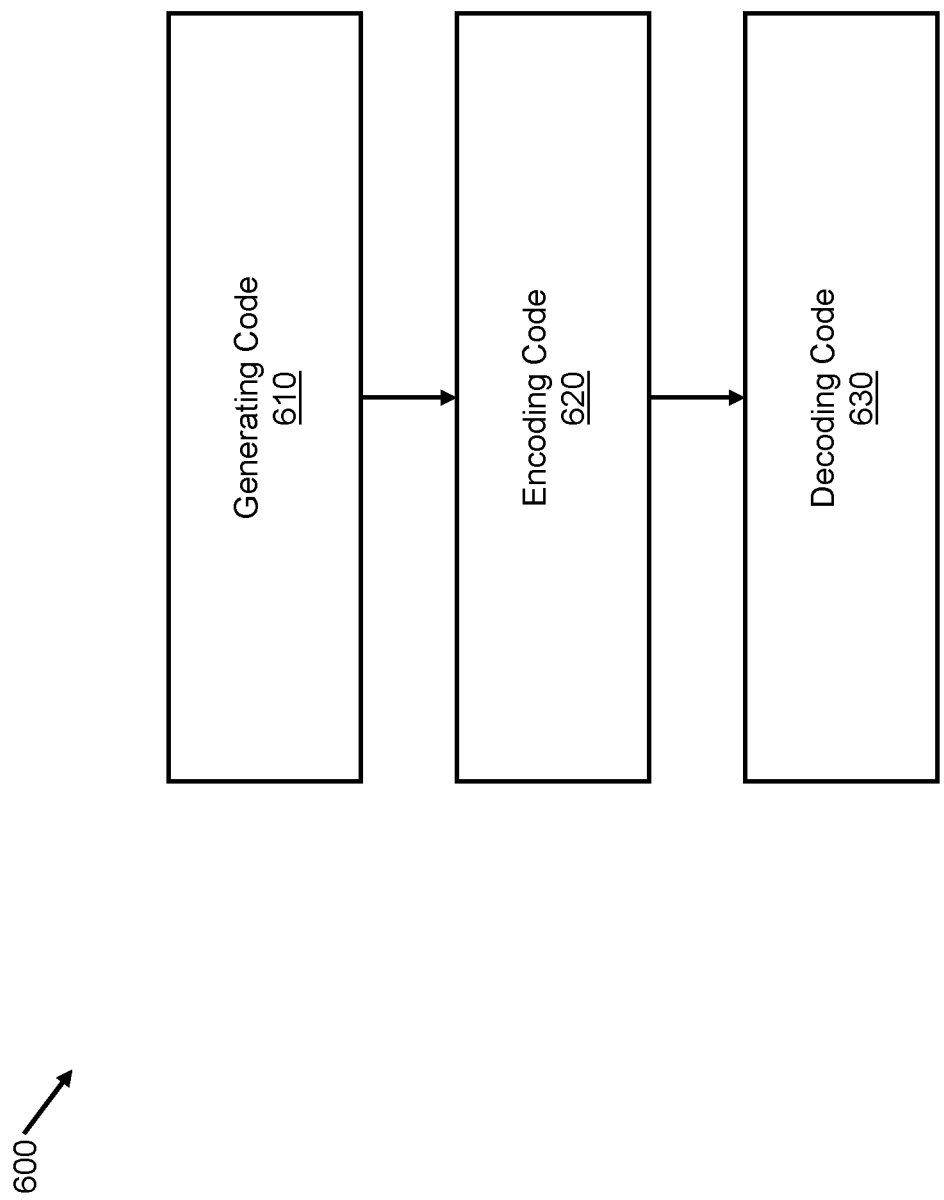
FIG. 6 is a block diagram of an apparatus for task-adaptive pre-processing for neural image compression, according to embodiments.

FIG. 6 is a block diagram of an apparatus 600 for task-adaptive pre-processing for neural image compression, according to embodiments.

As shown in FIG. 6, the apparatus 600 includes generating code 610, encoding code 620 and decoding code 630.

The generating code 610 is configured to cause at least one processor to generate a substitutional image, based on an input image, using a TAPP neural network.

The encoding code 620 is configured to cause the at least one processor to encode the generated substitutional image to generate a compressed representation, using a first neural network.

The TAPP neural network is trained by generating a substitutional training image, based on an input training image, using the TAPP neural network, encoding the generated substitutional training image to generate a compressed training representation, using the first neural network, decoding the generated compressed training representation to reconstruct an output training image, using a second neural network, generating gradients of a rate-distortion (R-D) loss that is generated based on the input training image, the reconstructed output training image and the generated compressed training representation, and updating the generated substitutional training image, based on the generated gradients of the R-D loss.

The decoding code 630 is configured to cause the at least one processor to decode the generated compressed representation to reconstruct an output image, using the second neural network.

The generating code 610 may be further configured to cause the at least one processor to generate a substitutional perturbation, based on the input image, using the TAPP neural network, and generate the substitutional image as a sum of the input image and the generated substitutional perturbation.

The TAPP neural network may be further trained by generating the R-D loss, based on a hyperparameter, a distortion loss that is a reconstruction error between the input training image and the reconstructed output training image, and a rate loss that is a bit consumption of the generated compressed training representation.

The gradients of the R-D loss may be generated and the generated substitutional training image may be updated until a maximum number of iterations is performed or until the R-D loss converges.

The TAPP neural network may be further trained by updating the input training image, based on the generated gradients of the R-D loss, and the gradients of the R-D loss may be generated and the input training image may be updated until a maximum number of iterations is performed or until the R-D loss converges.

The TAPP neural network may be trained by generating a substitute distortion as a difference between a ground-truth substitutional image and the generated substitutional training image, generating gradients of the generated substitute distortion, and updating parameters of the TAPP neural network, based on the generated gradients of the generated substitute distortion.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of task-adaptive pre-processing (TAPP) for neural image compression, the method being performed by at least one processor, and the method comprising:
    generating a substitutional image, based on an input image, using a TAPP neural network; and
    encoding the generated substitutional image to generate a compressed representation, using a first neural network,
    wherein the TAPP neural network is trained by:
        generating a substitutional training image, based on an input training image, using the TAPP neural network;
        encoding the generated substitutional training image to generate a compressed training representation, using the first neural network;
        decoding the generated compressed training representation to reconstruct an output training image, using a second neural network;
        generating gradients of a rate-distortion (R-D) loss that is generated based on the input training image, the reconstructed output training image and the generated compressed training representation; and
        updating the generated substitutional training image, based on the generated gradients of the R-D loss.

2. The method of claim 1, further comprising decoding the generated compressed representation to reconstruct an output image, using the second neural network.

3. The method of claim 1, wherein the generating the substitutional image comprises:
    generating a substitutional perturbation, based on the input image, using the TAPP neural network; and
    generating the substitutional image as a sum of the input image and the generated substitutional perturbation.

4. The method of claim 1, wherein the TAPP neural network is further trained by generating the R-D loss, based on a hyperparameter, a distortion loss that is a reconstruction error between the input training image and the reconstructed output training image, and a rate loss that is a bit consumption of the generated compressed training representation.

5. The method of claim 1, wherein the gradients of the R-D loss are generated and the generated substitutional training image is updated until a maximum number of iterations is performed or until the R-D loss converges.

6. The method of claim 1, wherein the TAPP neural network are further trained by updating the input training image, based on the generated gradients of the R-D loss, and
    the gradients of the R-D loss are generated and the input training image is updated until a maximum number of iterations is performed or until the R-D loss converges.

7. The method of claim 1, wherein the TAPP neural network is further trained by:
    generating a substitute distortion as a difference between a ground-truth substitutional image and the generated substitutional training image;
    generating gradients of the generated substitute distortion; and
    updating parameters of the TAPP neural network, based on the generated gradients of the generated substitute distortion.

8. An apparatus for task-adaptive pre-processing (TAPP) for neural image compression, the apparatus comprising:
    at least one memory configured to store program code; and
    at least one processor configured to read the program code and operate as instructed by the program code, the program code comprising:
        generating code configured to cause the at least one processor to generate a substitutional image, based on an input image, using a TAPP neural network; and
        encoding code configured to cause the at least one processor to encode the generated substitutional image to generate a compressed representation, using a first neural network,
    wherein the TAPP neural network is trained by:
        generating a substitutional training image, based on an input training image, using the TAPP neural network;

encoding the generated substitutional training image to generate a compressed training representation, using the first neural network;

decoding the generated compressed training representation to reconstruct an output training image, using a second neural network;

generating gradients of a rate-distortion (R-D) loss that is generated based on the input training image, the reconstructed output training image and the generated compressed training representation; and updating the generated substitutional training image, based on the generated gradients of the R-D loss.

9. The apparatus of claim 8, wherein the program code further comprises decoding code configured to cause the at least one processor to decode the generated compressed representation to reconstruct an output image, using the second neural network.

10. The apparatus of claim 8, wherein the generating code is further configured to cause the at least one processor to:
generate a substitutional perturbation, based on the input image, using the TAPP neural network; and
generate the substitutional image as a sum of the input image and the generated substitutional perturbation.

11. The apparatus of claim 8, wherein the TAPP neural network is further trained by generating the R-D loss, based on a hyperparameter, a distortion loss that is a reconstruction error between the input training image and the reconstructed output training image, and a rate loss that is a bit consumption of the generated compressed training representation.

12. The apparatus of claim 8, wherein the gradients of the R-D loss are generated and the generated substitutional training image is updated until a maximum number of iterations is performed or until the R-D loss converges.

13. The apparatus of claim 8, wherein the TAPP neural network are further trained by updating the input training image, based on the generated gradients of the R-D loss, and
the gradients of the R-D loss are generated and the input training image is updated until a maximum number of iterations is performed or until the R-D loss converges.

14. The apparatus of claim 8, wherein the TAPP neural network is trained by:
generating a substitute distortion as a difference between a ground-truth substitutional image and the generated substitutional training image;
generating gradients of the generated substitute distortion; and
updating parameters of the TAPP neural network, based on the generated gradients of the generated substitute distortion.

15. A non-transitory computer-readable medium storing instructions that, when executed by at least one processor for task-adaptive pre-processing (TAPP) for neural image compression, cause the at least one processor to:

generate a substitutional image, based on an input image, using a TAPP neural network; and
encode the generated substitutional image to generate a compressed representation, using a first neural network,
wherein the TAPP neural network is trained by:
generating a substitutional training image, based on an input training image, using the TAPP neural network;
encoding the generated substitutional training image to generate a compressed training representation, using the first neural network;
decoding the generated compressed training representation to reconstruct an output training image, using a second neural network;
generating gradients of a rate-distortion (R-D) loss that is generated based on the input training image, the reconstructed output training image and the generated compressed training representation; and
updating the generated substitutional training image, based on the generated gradients of the R-D loss.

16. The non-transitory computer-readable medium of claim 15, wherein the instructions, when executed by the at least one processor, further cause the at least one processor to decode the generated compressed representation to reconstruct an output image, using the second neural network.

17. The non-transitory computer-readable medium of claim 15, wherein the instructions, when executed by the at least one processor, further cause the at least one processor to:
generate a substitutional perturbation, based on the input image, using the TAPP neural network; and
generate the substitutional image as a sum of the input image and the generated substitutional perturbation.

18. The non-transitory computer-readable medium of claim 15, wherein the TAPP neural network is further trained by generating the R-D loss, based on a hyperparameter, a distortion loss that is a reconstruction error between the input training image and the reconstructed output training image, and a rate loss that is a bit consumption of the generated compressed training representation.

19. The non-transitory computer-readable medium of claim 15, wherein the gradients of the R-D loss are generated and the generated substitutional training image is updated until a maximum number of iterations is performed or until the R-D loss converges.

20. The non-transitory computer-readable medium of claim 15, wherein the TAPP neural network are further trained by updating the input training image, based on the generated gradients of the R-D loss, and
the gradients of the R-D loss are generated and the input training image is updated until a maximum number of iterations is performed or until the R-D loss converges.

* * * * *